Aug. 12, 1958     A. STOUT     2,847,224
SPREADER ATTACHMENT FOR MOWER
Filed July 29, 1955     2 Sheets-Sheet 1
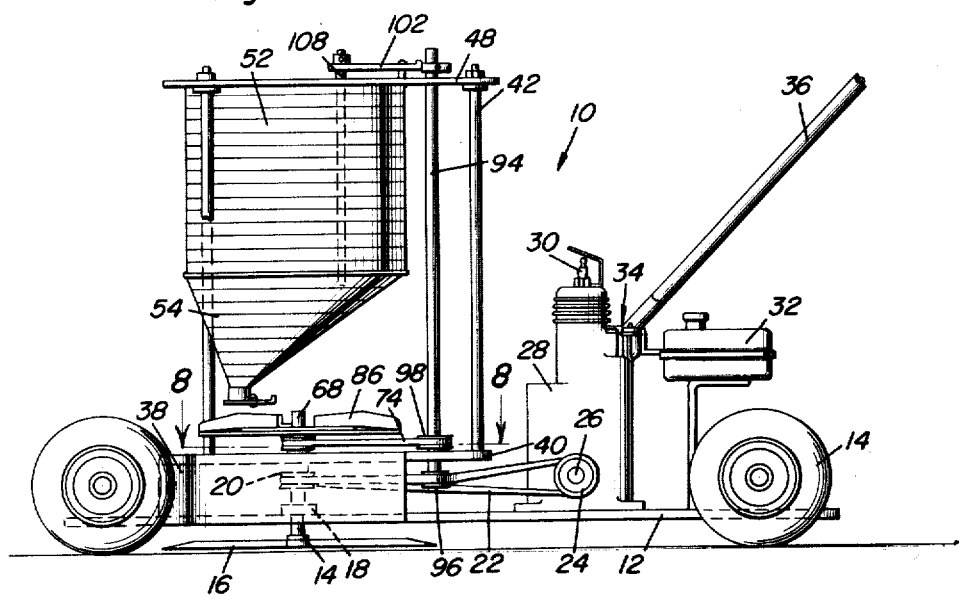
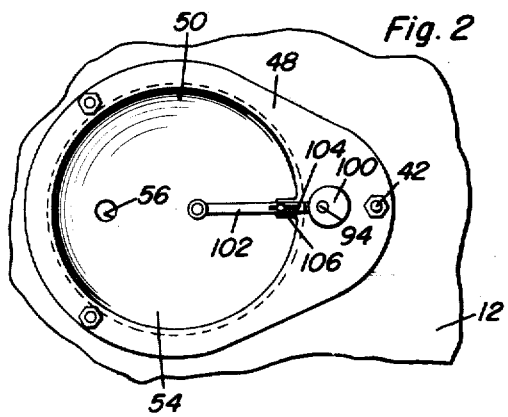
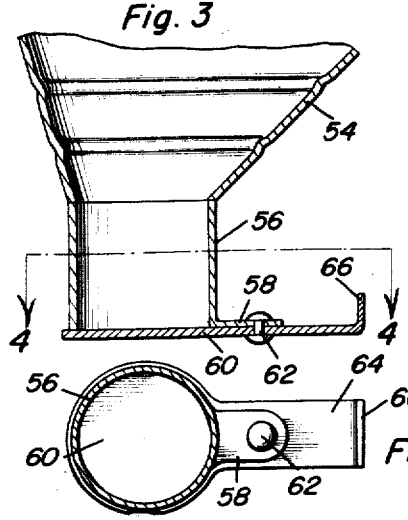
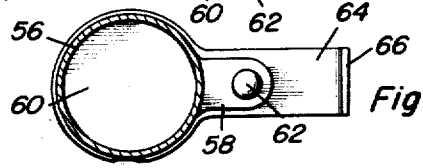
Alden Stout
INVENTOR.

Aug. 12, 1958  A. STOUT  2,847,224
SPREADER ATTACHMENT FOR MOWER
Filed July 29, 1955  2 Sheets-Sheet 2
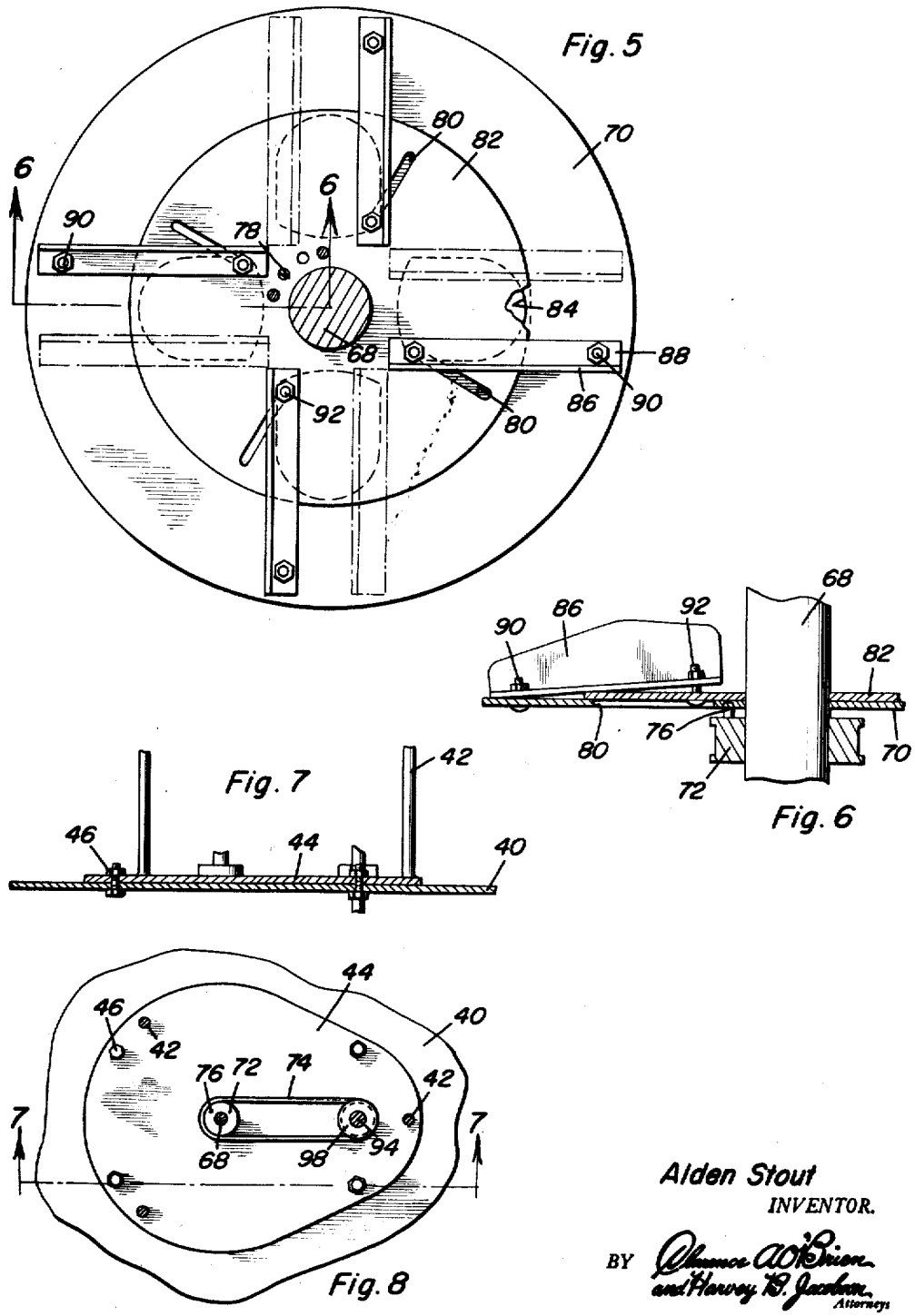
Alden Stout
INVENTOR.

United States Patent Office 2,847,224
Patented Aug. 12, 1958

2,847,224

SPREADER ATTACHMENT FOR MOWER

Alden Stout, Wapakoneta, Ohio

Application July 29, 1955, Serial No. 525,216

2 Claims. (Cl. 275—8)

This invention generally relates to a combined spreader and mower and more specifically provides a spreader used in combination with a lawn mower, which spreader may be utilized for spreading fertilizer or the like.

An object of the present invention is to provide a combination lawn mower and spreader mechanism which may be utilized for simultaneously mowing the lawn and spreading fertilizer thereon.

The construction of the present invention embodies a wheeled frame having a power source of any suitable type thereon for driving the lawn mower blade simultaneously with a rotatable plate having flanges thereon that is mounted under a hopper having a discharge spout wherein material discharged from the hopper will be spread over a relatively large area by rotation of the spreading plate simultaneously with the mower blade.

Another important object of the present invention is to provide a combination spreader and mower in conformance with the preceding construction wherein agitating means is driven by the single power source for agitating the material in the hopper for assuring discharge thereof onto the spreader plate.

Other important objects of the present invention will reside in its simplicity of construction, efficiency of operation, adaptation for its particular purpose and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the combination spreader and mower of the present invention;

Figure 2 is a detail plan view of the hopper construction illustrating the eccentric for driving the agitating means within the hopper;

Figure 3 is an enlarged detailed sectional view illustrating the lower end of the hopper and the pivotal closure therefor;

Figure 4 is a plan sectional view taken substantially upon a plane passing along section line 4—4 of Figure 3 illustrating further structural details of the hopper spout;

Figure 5 is an enlarged plan view of the rotatable spreader plate mounted on the vertical shaft and illustrating the adjustment means therefor;

Figure 6 is a detailed sectional view taken substantially upon a plane passing along section line 6—6 of Figure 5 illustrating the specific mounting construction of the radial blades together with the adjustment means therefor;

Figure 7 is a transverse, vertical sectional view taken substantially upon a plane passing along section line 7—7 of Figure 8 illustrating the details of construction of the means for attaching the hopper to the wheeled frame; and Figure 8 is a plan sectional view taken substantially upon a plane passing along section line 8—8 of Figure 1 illustrating the driving means for the spreader plate vertical shaft.

With reference to the drawings, the numeral 10 generally designates the combination spreader and mower of the present invention including an elongated generally rectangular frame 12 having supporting wheels 14 journaled at each side thereof adjacent each end for forming a mobile frame. Adjacent the center of the frame 12 and towards the forward end thereof is rotatably journaled a vertical shaft 14 having a mower blade 16 mounted therein for rotation about a vertical axis. The shaft 14 extends through the frame 12 and is supported thereon by a suitable bearing 18 and provided with a pulley 20 on its upper end wherein an endless drive belt 22 encircles the pulley 20 and a pulley 24 on the drive shaft 26 of a small gas motor 28. The gas motor 28 is provided with the usual spark plug 30 together with a fuel tank 32 and control mechanism generally designated by the numeral 34. It will be understood that any suitable type of power source may be utilized having adequate power for the rotation of the cutter blade 16 and the spreader portion of the invention. A suitable handle 36 may be pivoted to the motor or the frame for moving the combination spreader and mower 10 over the ground surface.

A generally U-shaped enclosure wall 38 is provided in upstanding relation to the upper surface of the frame 12 wherein a base plate 40 closes the upper end of the wall 38 and is in generally vertically spaced and parallel relation to the frame 12. The wall 38 encloses the pulley 20 together with a portion of the belt drive 22 for protecting persons from accidental injury if they should position their hands adjacent the pulley 20.

A plurality of vertical rods 42 are supported on a supporting plate 44 which is secured to the base plate 40 by a plurality of fastener bolts 46. The vertical rods 42 are provided with an upper plate member 48 which is generally the same shape as the supporting plate 44 and provided with an enlarged opening 50 forming the entrance to an enlarged vertically disposed and substantially cylindrical hopper 52. The hopper 52 is provided with a lower funnel-shaped end 54 terminating in substantially a cylindrical spout 56 of reduced cross-sectional area that is provided with an integral and laterally extending lug 58 pivotally supporting a closure plate 60 on rivet pin 62. The closure plate 60 is provided with a laterally extending handle 64 having an upturned lug 66 on the outer end thereof wherein the closure plate 60 may be pivoted about pin 62 from a position underlying the open end of the spout 56 for forming a closure therefor to a position out of registry with the lower end of the spout 56, thereby permitting discharge of material from the spout 56.

Rotatably journaled in the plate 40 is a vertical shaft 68 having a circular plate 70 positioned thereon. Disposed under the plate 70 is a pulley 72 rigidly mounted to the shaft 68 for receiving an endless belt 74. The pulley 72 is provided with an upstanding pin 76 on its upper surface for selective registry with one of a plurality of arcuately disposed apertures 78 in the plate 70, thereby drivingly connecting the plate 70 with the pulley 72. Disposed in the plate 70 is a plurality of radially extending circumferentially spaced slots 80. Mounted in engagement with the upper surface of the plate 70 is an annular actuator plate 82 having a plurality of enlarged and generally oblong-shaped openings 84 therein equal in number to the number of slots 80 in the plate 70.

Mounted on the upper surface of the plate 70 and bridging the outer peripheral edge of the actuator plate 82 is a plurality of upstanding radially disposed flanges 86 having a horizontal mounting flange 88 secured to the plate 70 adjacent the outer periphery thereof by bolts 90 which form a pivotal connection between the flanges 86 and the plate 70. The inner end of the flanges 86 are provided with fastening members 92 extending therethrough and positioned in the slot 80 wherein the radial flanges 86 are secured in position by tightening the fastening members 90. If the fastening members 90 and 92 are loosened and the actuator plate rotated in relation to the plate 70, the position of the flanges 86 may be adjusted, thereby varying the spreading characteristics of the spreader plate as it rotates about the vertical shaft 68. As illustrated in Figure 1, the discharge spout 56 of the hopper 52 is so positioned that material discharged therefrom will be discharged on the upper surface of the plates 70 and 82 between the flanges 86 wherein the flanges 86 will centrifugally spread the material thereon depending upon the rotational speed thereof.

For driving the shaft 68, an elongated vertically disposed shaft 94 is mounted between and through the base plate 40 and the top plate 48 and is provided with a lowermost pulley 96 in engagement with the belt drive 22 for rotation of the shaft 94. An upper pulley 98 is provided in alignment with the pulley 72 on the shaft 68 for encircling engagement by the belt 74 whereby the plate 70 will be rotated as set forth previously.

The upper end of the shaft 94 is provided with an eccentric member 100 that is journaled in one end of a link 102. The link 102 is provided with a slot 104 for receiving a fastening member connected to a supporting lug 106 on the upper wall 48. The inner end of the link 102 is connected to a vertically disposed agitating rod 108 which is depended into the hopper 52 for agitating the material therein to assure that a supply of the material will be discharged through the spout 56 onto the rotating plates 70 and 82 for spreading thereby.

Various supporting bearings and other minute structural details may be provided as needed, and it will be seen that the present invention provides a highly efficient combination spreader and mower for simultaneously mowing the lawn and spreading fertilizer or the like thereon with a vertical or horizontal motor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A spreader comprising a wheeled frame, a power source on said frame, a drive shaft on said power source, belt means connected to said drive shaft, a rotatable plate having a shaft mounted on said frame in upstanding relation for rotation about a vertical axis, a hopper disposed above said plate, a discharge spout on said hopper, means for controlling flow of material from the spout onto the plate, a plurality of upwardly projecting radial flanges on said plate, and means interconnected with said belt means for rotating said plate thereby spreading material discharged from the spout onto the plate, and means for agitating the material in the hopper, and means interconnected with said belt drive means for driving said agitating means, said flanges being adjustably mounted on said plate for varying the pattern of spreading thereof, said plate including a plurality of radially disposed slots, an annular actuating member disposed between the plate and the upstanding flanges, depending fasteners on the inner ends of the flanges extending through said actuator plate and slots, said actuator plate having enlarged apertures permitting passage of said fasteners, said flanges being pivoted to said plate at their outer ends whereby rotation of said actuator plate will cause simultaneous angular adjustment of all of said flanges, and means for locking the plate and actuator plate in angularly adjusted position.

2. A spreader comprising a wheeled frame, a power source on said frame, a drive shaft on said power source, belt means connected to said drive shaft, a rotatable plate having a shaft mounted on said frame in upstanding relation for rotation about a vertical axis, a hopper disposed above said plate, a discharge spout on said hopper, means for controlling flow of material from the spout onto the plate, a plurality of upwardly projecting radial flanges on said plate, and means interconnected with said belt means for rotating said plate thereby spreading material discharged from the spout onto the plate, and means for agitating the material in the hopper, said flanges being adjustably mounted on said plate for varying the pattern of spreading thereof, said agitating means including a link slidably and pivotally mounted on the upper end of the hopper, a depending agitating rod mounted on the inner end of the link and disposed in the hopper, a vertical shaft mounted exteriorly of said hopper and drivingly engaging said belt means, an eccentric on the upper end of said vertical shaft, the outer end of said link being journaled on said eccentric for reciprocation and pivotal movement of the agitating rod, said plate including a plurality of radially disposed slots, an annular actuating member disposed between the plate and the upstanding flanges, depending fasteners on the inner ends of the flanges extending through said actuator plate and slots, said actuator plate having enlarged apertures permitting passage of said fasteners, said flanges being pivoted to said plate at their outer ends whereby rotation of said actuator plate will cause simultaneous angular adjustment of all of said flanges, and means for locking the plate and actuator plate in angularly adjusted position.

References Cited in the file of this patent

UNITED STATES PATENTS

| 351,988 | Lord | Nov. 2, 1886 |
| 1,459,915 | Koehmstedt | June 26, 1923 |
| 2,332,903 | Downey et al. | Oct. 26, 1943 |
| 2,553,403 | Cory | May 15, 1951 |
| 2,573,784 | Asbury | Nov. 6, 1951 |

FOREIGN PATENTS

| 50,574 | Netherlands | June 16, 1941 |